(12) United States Patent
Nichols et al.

(10) Patent No.: US 8,732,358 B2
(45) Date of Patent: May 20, 2014

(54) CIRCUIT SYSTEMS AND METHODS USING PRIME NUMBER INTERLEAVE OPTIMIZATION FOR BYTE LANE TO TIME SLICE CONVERSION

(71) Applicant: Ciena Corporation, Hanover, MD (US)

(72) Inventors: Jeffery T. Nichols, Marietta, GA (US); Roger R. Darr, Cumming, GA (US)

(73) Assignee: Ciena Corporation, Hanover, MD (US)

( * ) Notice: Subject to any disclaimer, the term of this patent is extended or adjusted under 35 U.S.C. 154(b) by 55 days.

(21) Appl. No.: 13/630,343

(22) Filed: Sep. 28, 2012

(65) Prior Publication Data

US 2014/0095743 A1    Apr. 3, 2014

(51) Int. Cl.
*G06F 3/06*    (2006.01)
*G06F 13/00*    (2006.01)

(52) U.S. Cl.
USPC ............. 710/52; 710/2; 710/5; 710/8; 710/15

(58) Field of Classification Search
None
See application file for complete search history.

(56) References Cited

U.S. PATENT DOCUMENTS

| | | | |
|---|---|---|---|
| 6,590,900 B1 | 7/2003 | Peting et al. | |
| 7,577,180 B2 | 8/2009 | Boulton | |
| 7,948,872 B2 | 5/2011 | Patel et al. | |
| 7,978,702 B2 | 7/2011 | Chang et al. | |
| 8,090,973 B2 | 1/2012 | Bennett | |
| 2003/0225958 A1* | 12/2003 | Efland et al. | 711/1 |
| 2007/0067696 A1* | 3/2007 | Bhatt et al. | 714/758 |
| 2007/0189231 A1* | 8/2007 | Chang et al. | 370/335 |
| 2009/0225792 A1 | 9/2009 | Benjes | |

* cited by examiner

*Primary Examiner* — Scott Sun
(74) *Attorney, Agent, or Firm* — Clements Bernard PLLC; Christopher L. Bernard; Lawrence A. Baratta, Jr.

(57) ABSTRACT

Circuit systems and methods use prime number interleave optimization for byte lane to time slice conversion of incoming data streams. Generally, the systems and methods buffer data for at least a number of samples equal to the number of byte lanes. Then the samples are transferred to a bank of buffers whose width is the smallest prime number greater than or equal to the number of byte lanes, N. Thus, the systems and methods utilize P minus N phantom lanes. As data is transferred, the data is circularly interleaved (position*N modulo P) so that all data which will be needed at the same time wind up in different readable devices, i.e. the buffers. By appropriate addressing, the data in the different readable devices may then be read in the form of time slices. The process can be reversed for time slice to byte lane conversion.

20 Claims, 13 Drawing Sheets

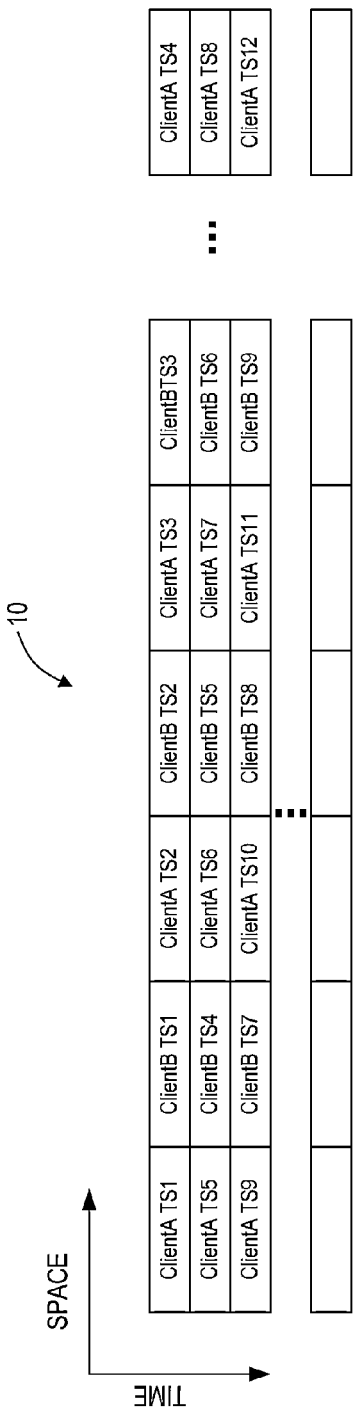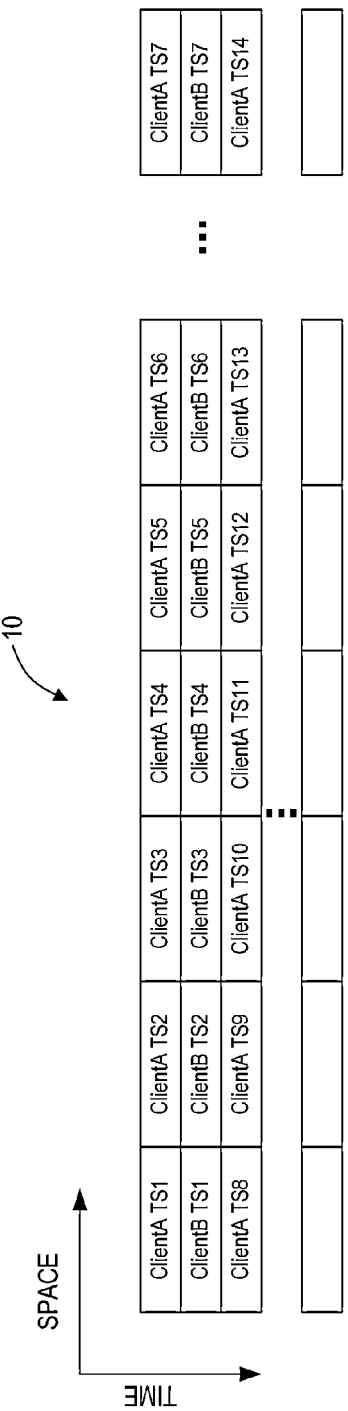

CIRCUIT SYSTEMS AND METHODS USING PRIME NUMBER INTERLEAVE OPTIMIZATION FOR BYTE LANE TO TIME SLICE CONVERSION

FIELD OF THE INVENTION

Generally, the field of art of the present disclosure pertains to digital hardware and circuit systems and methods, and more particularly, to circuit systems and methods using prime number interleave optimization for byte lane to time slice conversion of incoming data streams.

BACKGROUND OF THE INVENTION

High speed data into circuitry is typically arranged in byte lanes where data belonging to one or more different entities or clients is presented simultaneously. For example, the circuitry can be part of a cross-connect, switch, packet switch, Optical Transport Network (OTN) network element, and the like. Higher bit-rate clients will occupy more byte lanes out of the total available to a particular blade. For example, an Optical channel Data Unit level 4 (ODU4) can include eighty (80) lanes of ODUflex channels, and each lane can belong to any number of clients in any order. For processing of this data, it is required that the full bandwidth is arranged such that a full width sample in time (i.e., a time slice) all belongs to a single client or cross-connected entity. Put differently, the byte lanes come in with different clients occupying different lanes, but processing circuitry requires a time slice across all lanes belong to a single client. Thus, the data can be in byte lane format with different clients occupying different lanes or in time slice format with each slice across all byte lanes belonging to a same client in order. Conversion from one format to the other when the sizes and arrangements of the entities are fully configurable becomes an increasingly resource intensive task as the total number of byte lanes increases.

BRIEF SUMMARY OF THE INVENTION

In an exemplary embodiment, a circuit includes N byte lanes, wherein N is an integer; and a plurality of buffers forming P byte lanes, wherein P is a smallest prime number such that P≥N with P minus N of the P byte lanes being phantom lanes; wherein data from the N byte lanes is circularly interleaved into the plurality of buffers such that data for time slices needed at a same time is located in different buffers; and wherein the data is read out of the plurality of buffers with appropriate addressing to convert to time slices. The circuit can further include an incoming set of buffers for at least a number of samples equal to N; wherein the data from the N byte lanes is first stored in the incoming set of buffers and transferred into the plurality of buffers thereafter. Bytes can be collected in groups of N in the incoming set of buffers. The N byte lanes can include at least one client and each of the at least one client occupying any number M of tributary slots, M≤N. Each of the at least one client can be circularly interleaved by its M number of tributary slots such that each of the N byte lanes moves to a position (l*M) modulo P, where l is a number of each of the N byte lanes. Each row of the at least one client can be barrel shifted by a factor based upon its row position, the factor being a first row not being shifted and each subsequent row being shifted +1 from a previous row. Each of the at least one client can be positioned into a sequential set of memory locations. Each byte lane can be read in a proper order such that each row contains P sequential bytes of the at least one client. The circuit can further include a P-to-N gearbox to remove the phantom lanes. A value for P can selected to utilize finite field arithmetic in GF(P) guaranteeing different fields of the N byte lanes are slotted in correct lanes when converting to the time slices. Each of the N byte lanes can correspond to an Optical channel Data Unit flex (ODUflex).

In another exemplary embodiment, a system includes an input circuit; a byte lane to time slice conversion circuit; and a processing circuit; wherein the input circuit provides an aggregated signal of N byte lanes to the byte lane to time slice conversion circuit, and the byte lane to time slice conversion circuit converts the N byte lanes into time slices for the processing circuit utilizing a plurality of buffers, phantom lanes are configured to ensure data need for the time slices from different byte lanes are in different buffers, and an addressing scheme to read out the data in the plurality of buffers to form the time slices. The input circuit and the byte lane to time slice conversion circuit can include N byte lanes, wherein N is an integer; and a plurality of buffers forming P byte lanes, wherein P is a smallest prime number such that P≥N with P minus N of the P byte lanes being phantom lanes; wherein data from the N byte lanes is circularly interleaved into the plurality of buffers such that data for time slices needed at a same time is located in different buffers; and wherein the data is read out of the plurality of buffers with appropriate addressing to convert to time slices.

In yet another exemplary embodiment, a method includes receiving an incoming aggregated signal; buffering the data from the incoming aggregated signal in a first set of buffers including N lanes; circularly interleaving the data into a second set of buffers including P lanes, wherein P is a smallest prime number such that P≥N; and reading the data out of the second set of buffers with an appropriate addressing scheme. The N lanes can include at least one client and each of the at least one client occupying any number M of tributary slots, M≤N. The method can further include circularly interleaving each of the at least one client by its M number of tributary slots such that each of the N lanes moves to a position (l*M) modulo P, where l is a number of each of the N lanes. The method can further include barrel shifting each row of the at least one client by a factor based upon its row position, the factor being a first row not being shifted and each subsequent row being shifted +1 from a previous row. The method can further include positioning each of the at least one client into a sequential set of memory locations. The method can further include reading each byte lane in a proper order such that each row contains P sequential bytes of the at least one client. The method can further include performing a P-to-N gearbox to remove the phantom lanes. The method can convert the incoming aggregated signal from a byte lane configuration to a time slice configuration relative to at least one client signals in the incoming aggregated signal, and wherein the method can be reversible to convert a signal in the time slice configuration to the byte lane configuration

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which:

FIGS. 1A-1B are block diagrams of an aggregated signal in byte lanes (FIG. 1A) and in time slices (FIG. 1B);

DETAILED DESCRIPTION OF THE INVENTION

Figure 2:
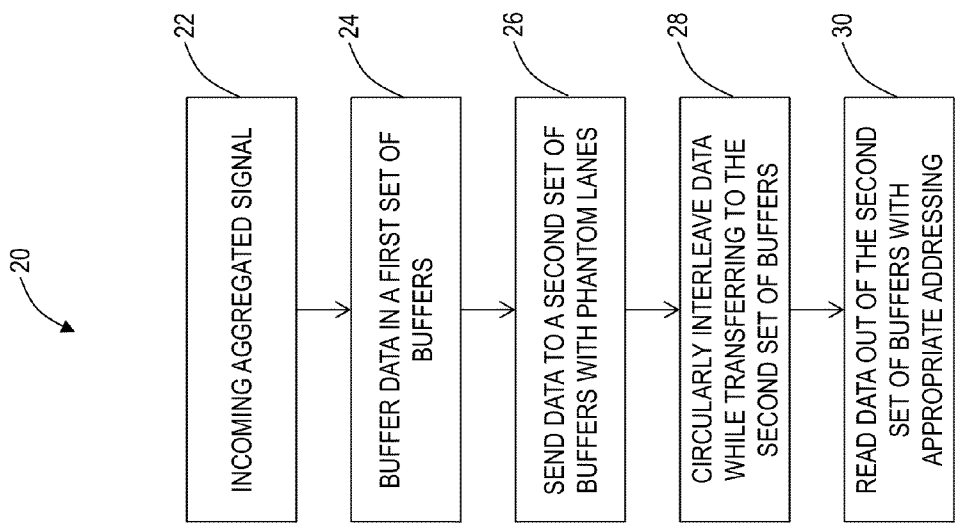
FIG. 2 is a flowchart of a byte lane to time slice conversion method implemented in circuitry.

In various exemplary embodiments, the present disclosure relates to circuit systems and methods using prime number interleave optimization for byte lane to time slice conversion of incoming data streams. Specifically, the circuit systems and methods provide various hardware optimized techniques to convert byte lanes to time slices without limitations. The circuit systems and methods contemplate implementation in high-speed hardware devices operating at 10 Gb/s, 40 Gb/s, 100 Gb/s, etc. In particular, the circuit systems and methods are applicable to converting ODUk byte lanes into time slices for processing thereof. As described herein, an ODU4 can have 80 byte lanes of ODUflex channels in any arbitrary configuration. For example, client A could have byte lanes 1, 3, 5, 6, 33, 77, and 78 and there can be any number of additional clients with any client occupying any byte lane. Note, also an ODU3 can have 32 byte lanes of ODUflex. The circuit systems and methods are useful for converting these arbitrary byte lanes into time slices, and are equally applicable to any other protocol besides OTN such as SONET, SDH, etc. An important objective of the circuit systems and methods is to be realizable in a hardware, e.g. Application Specific Integrated Circuit (ASIC), Field Programmable Gate Array (FPGA), or any other circuit/logic device. As bandwidth rates increase, e.g. 40 Gb/s (ODU3) to 100 Gb/s (ODU4), the number of byte lanes increases and the required resources for byte lane to time slice conversion grow exponentially. The circuit systems and methods provide a hardware optimized conversion technique that accounts for the challenges in high-speed systems with large and arbitrary byte lanes.

Referring to FIGS. 1A-1B, in an exemplary embodiment, block diagrams illustrate an aggregated signal 10 in byte lanes (FIG. 1A) and in time slices (FIG. 1B). The aggregated signal 10 can include any high-speed signal with a plurality of clients contained therein. For example, the aggregated signal 10 can be an ODUk, a Synchronous Transport Signal level n (STS-n), a Synchronous Transport Module level m (STM-m), etc. Conceptually, the aggregated signal 10 can be viewed as having a space dimension (denoted by different columns in FIGS. 1A-1B) and a time dimension (denoted by different rows in FIGS. 1A-1B). The columns represent different byte lanes in the aggregated signal 10. For example, in OTN, each column can represent an ODUflex (about 1.25 Gb/s of bandwidth). The rows represent successive data bytes over time. FIG. 1 illustrates the aggregated signal 10 in a byte lane configuration. In the various descriptions herein, there are assumed to be N byte lanes, N being an integer greater than zero. In the example of FIG. 1, there are two clients, client A and client B, and they are shown occupying every other byte lane of the aggregated signal 10.

Note, the byte lane configuration of FIG. 1A is how the aggregated signal 10 ingresses into a device. Specifically, the aggregated signal 10 ingresses into a device and is processed therein. The device can be switching circuitry, forwarding circuitry, etc. Generally, the device is referred to herein as processing circuitry. Importantly, FIG. 1A illustrates how the aggregated signal 10 is received, i.e. in the byte lane configuration. The processing circuitry needs the aggregated signal 10 to be in a time slice configuration. That is, the processing circuitry needs to operate on a single client and its associated time slots at any instance in time. FIG. 1B illustrates the time slice configuration. Importantly, the aggregated signal 10 is the same in FIGS. 1A and 1B with the difference being the arrangement of the clients and their time slots over both time and space. The circuit systems and methods described herein provide a generic mechanism to convert FIGS. 1A and 1B therebetween in a hardware optimized manner without occupancy restrictions.

Referring to FIG. 2, in an exemplary embodiment, a flowchart illustrates a byte lane to time slice conversion method 20 implemented in circuitry. The conversion method 20 includes receiving an incoming aggregated signal (step 22). The conversion method 20 buffers data for at least a number of samples equal to the number of byte lanes (step 24). In this step, a first set of buffers can be used to receive the incoming aggregated signal and to store bytes in groups of N (e.g., N is the number of byte lanes, and can also be the size of a time slice). Then, the samples are transferred to a second set of buffers whose width are the smallest prime number greater than or equal to the number of byte lanes, N, i.e. P≥N (step 26). By choosing the smallest prime number, P, greater than or equal to the number of byte lanes, the circuit systems and methods can take advantage of math in prime number finite fields where any two number is the field multiplied or added together modulo P is guaranteed to produce a unique result which is required in assigning samples to the buffers. Thus, the circuit systems and methods utilize P minus N phantom lanes that are added. Note, if N is already prime, it is not necessary to add the phantom lanes and N=P in this case. As data is transferred, the data is circularly interleaved (position*N modulo P) so that all data which will be needed at the same time wind up in different readable devices, i.e. the second set of buffers (step 28). By appropriate addressing, the data in the different readable devices may then be read in the form of time slices (step 30). The process can be reversed for time slice to byte lane conversion.

With respect to choosing the prime number, P, to expand the number of byte lanes with phantom lanes, the conversion method 20 is utilizing finite field arithmetic in GF(P). GF(P) is a ring of integers modulo P. That is, operations (addition, subtraction, multiplication) can be performed using the usual operation on integers, followed by reduction modulo P. For example, in GF(5), 4+3=7 is reduced to 2 modulo 5. The conversion method 20 takes advantage of these properties of finite field arithmetic in GF(P) to guarantee different fields in the byte lanes are slotted in correct lanes when converting to time slices.

Figure 3:
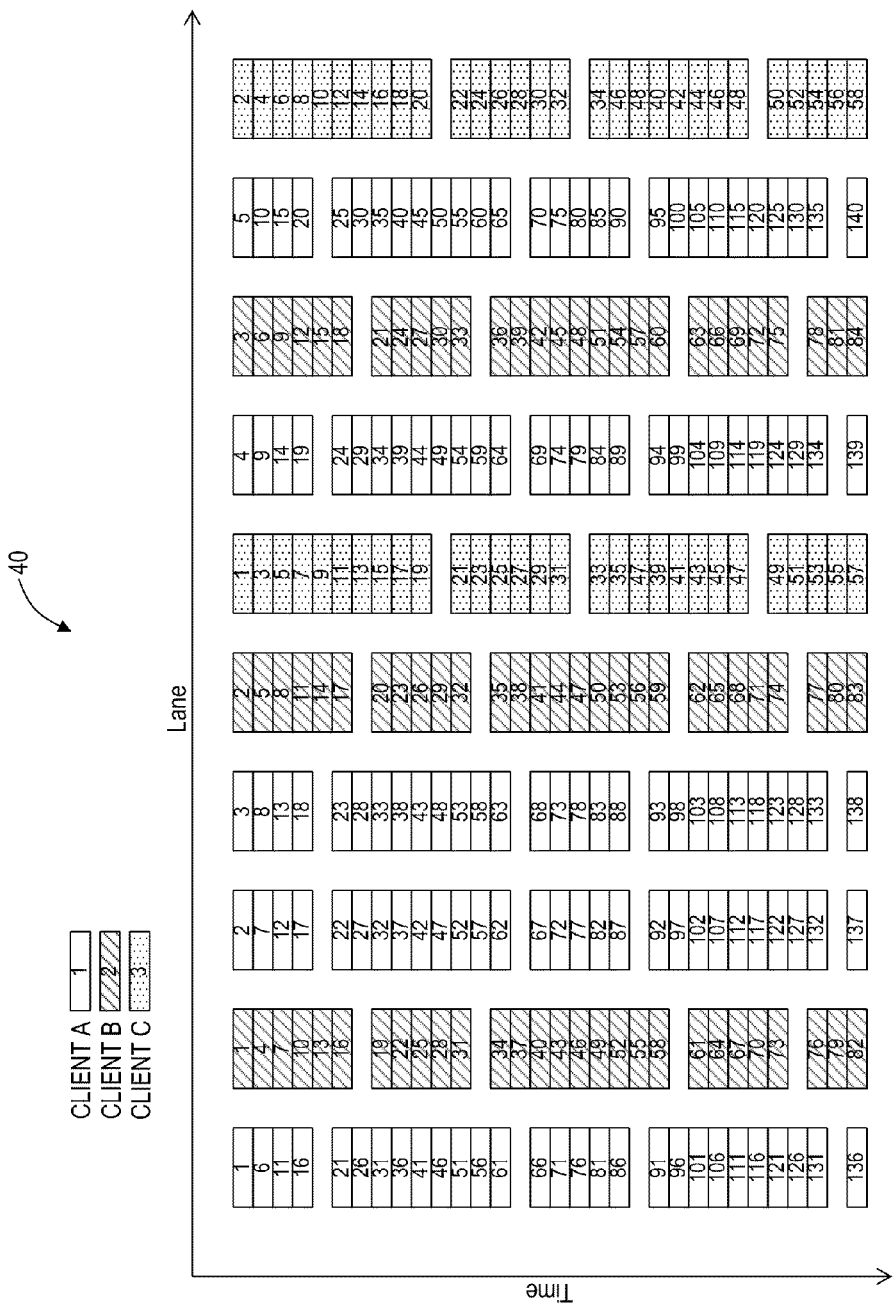
FIG. 3 is a block diagram of an exemplary signal illustrated with N=10 byte lanes with three clients spread across the 10 byte lanes.

Referring to FIGS. 3-10, in an exemplary embodiment, an exemplary signal 40 is illustrated with N=10 byte lanes with three clients spread across the 10 byte lanes and operations associated with the conversion method 20 are illustrated thereon. The three clients can be referred to as client A, client B, and client C. Each box in FIG. 3 represents a tributary slot at the appropriate time with numbers inside each tributary slot or byte indicative of a sequence for that particular client. For example, client A occupies byte lanes 1, 3, 4, 7, and 9, client B occupies byte lanes 2, 5, and 8, and client C occupies byte lanes 6 and 10. With respect to client A, byte lane 1 has the first byte, byte lane 3 has the second byte, etc. The circuit systems and methods contemplate any number of tributary slots or bytes, any number of clients, and any order therebetween. For example, a client may occupy any number, M, of tributary slots or bytes depending upon the client's bandwidth with M≤N. Also, the assignment of the clients to the tributary slot or byte positions is arbitrary, but the numbering is sequential of each client's tributary slots or bytes. The clients are byte interleaved across their constituent tributary slots or bytes. FIGS. 3-10 illustrate an exemplary operation of the conversion method 20, and FIG. 3 illustrates the incoming aggregated signal in the conversion method 20.

Figure 4:
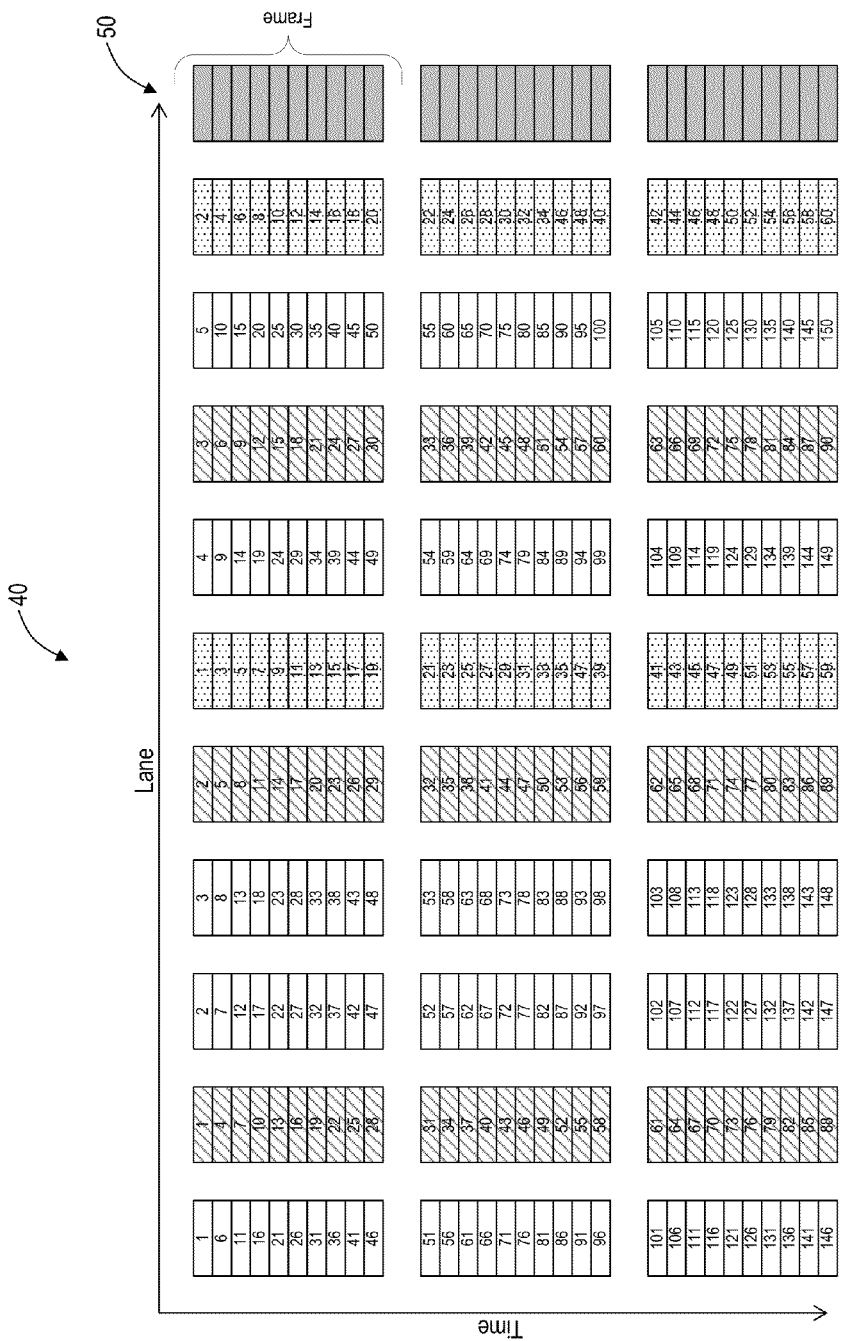
FIGS. 4-10 are block diagrams of operations of the conversion method of FIG. 2 on the exemplary signal of FIG. 3.

In FIG. 4, a phantom lane 50 is added to the N=10 byte lanes of FIG. 3, i.e. P=11. As described in the conversion method 20, for an N lane system, bytes are collected in groups of N. Each round, a client will present bytes on all of its lanes or will present none. For example, as noted in FIG. 3, not every client presents a byte every round, i.e. each round being a unit of time. In FIG. 4, the bytes are illustrated showing each client having a byte for each round in the first set of buffers. That is, in time, the byte lanes are grouped in groupings of N (i.e., 10) which can be referred to as a frame. As described in the conversion method 20, phantom lanes are added to pad the lane count to the first prime number, P≥N, or in the example here P=11 since N=10.

Figure 5:
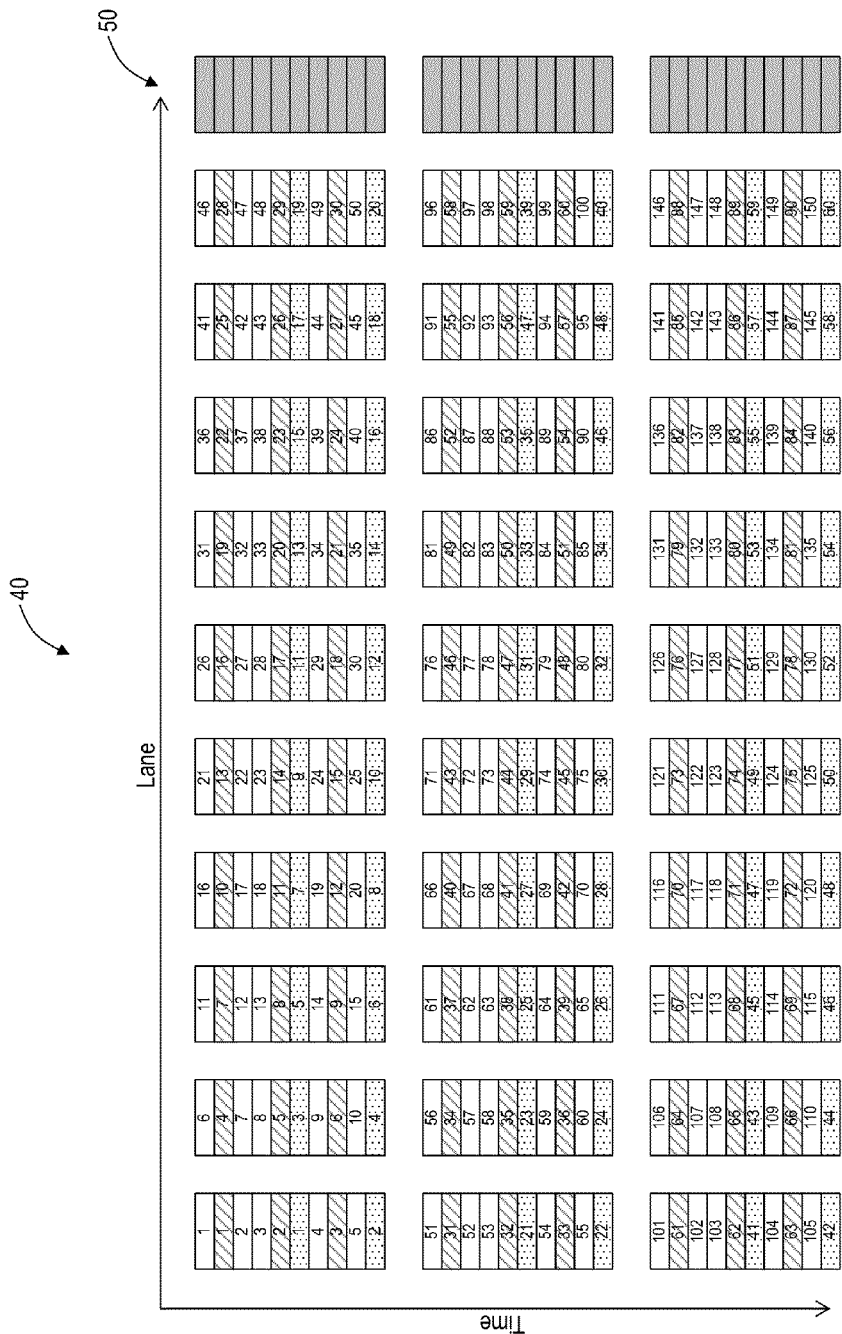

In FIG. 5, each set of N bytes per lane from FIG. 4 is repositioned across a row utilizing a barrel shifter and delay elements. Effectively, in FIG. 5, a column-to-row conversion is performed. Here, each frame from FIG. 4 in each byte lane is now repositioned across rows instead of byte lanes. For example, in FIG. 4, client A occupied the first byte lane with bytes 1, 6, 11, 16, 21, 26, 31, 41, and 46 occupying the first frame of the first byte lane. Now, in FIG. 4, these bytes are positioned across the first row using the barrel shifter and delay elements. An exemplary embodiment of the barrel shifter and delay elements is described herein in FIGS. 11-13.

Figure 6:
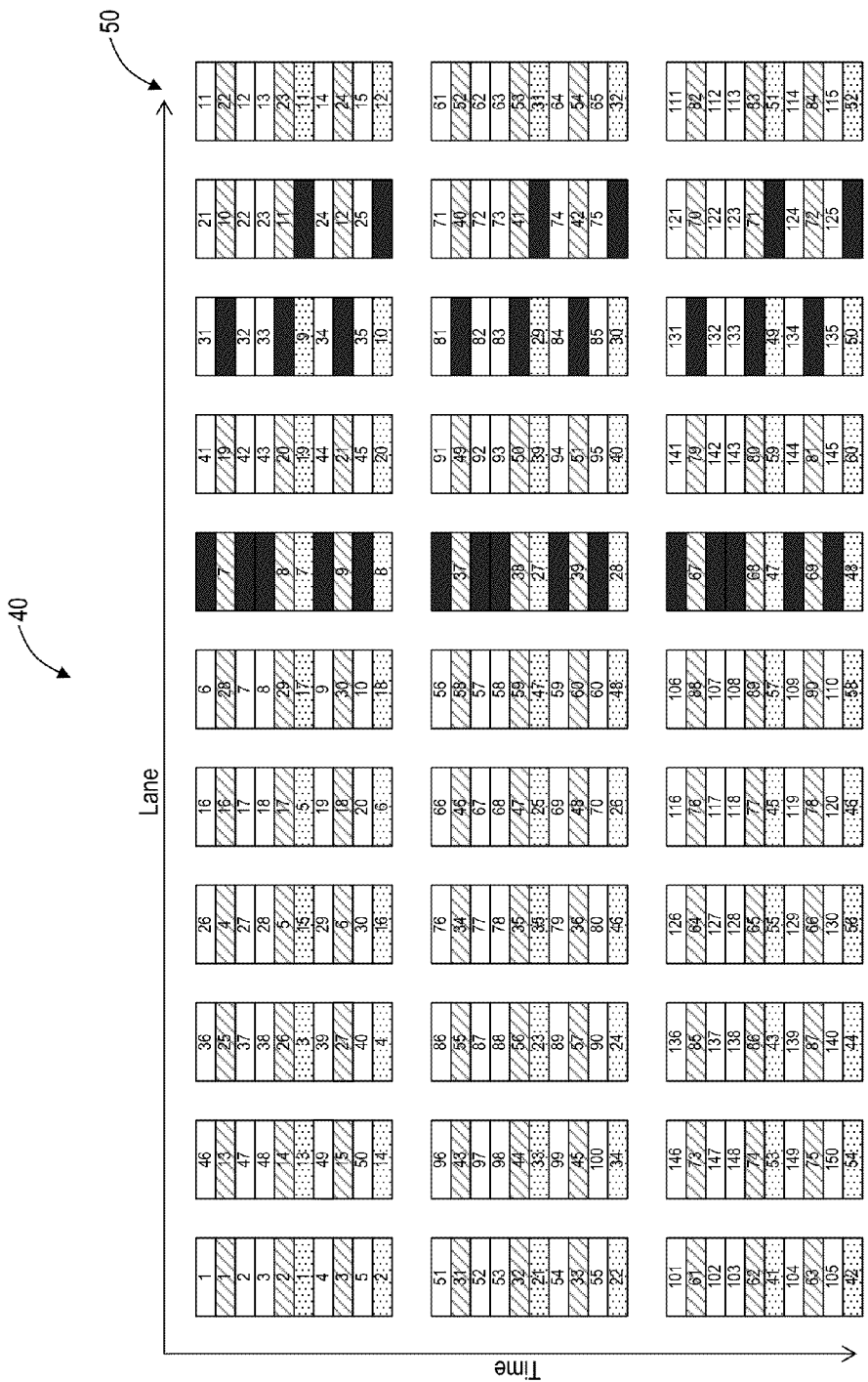

In FIG. 6, the phantom lane 50 is used by circularly interleaving each row of a client by its M number of tributary slots. Referring back to FIG. 3, M equals 5 for client A, M equals 3 for client B, and M equals 2 for client C. That is, M is the number of byte lanes occupied by each client and M is ≤N. If the byte lanes, l, are numbered from 0 to P-1, then each lane moves to a position (l*M) modulo P. As described herein, since P is a prime number, each byte lane moves to a unique new lane position. Further, since the phantom lane 50 is used here, each row has one empty position (or P-N empty positions) shown in FIG. 6 as all black.

Figure 7:
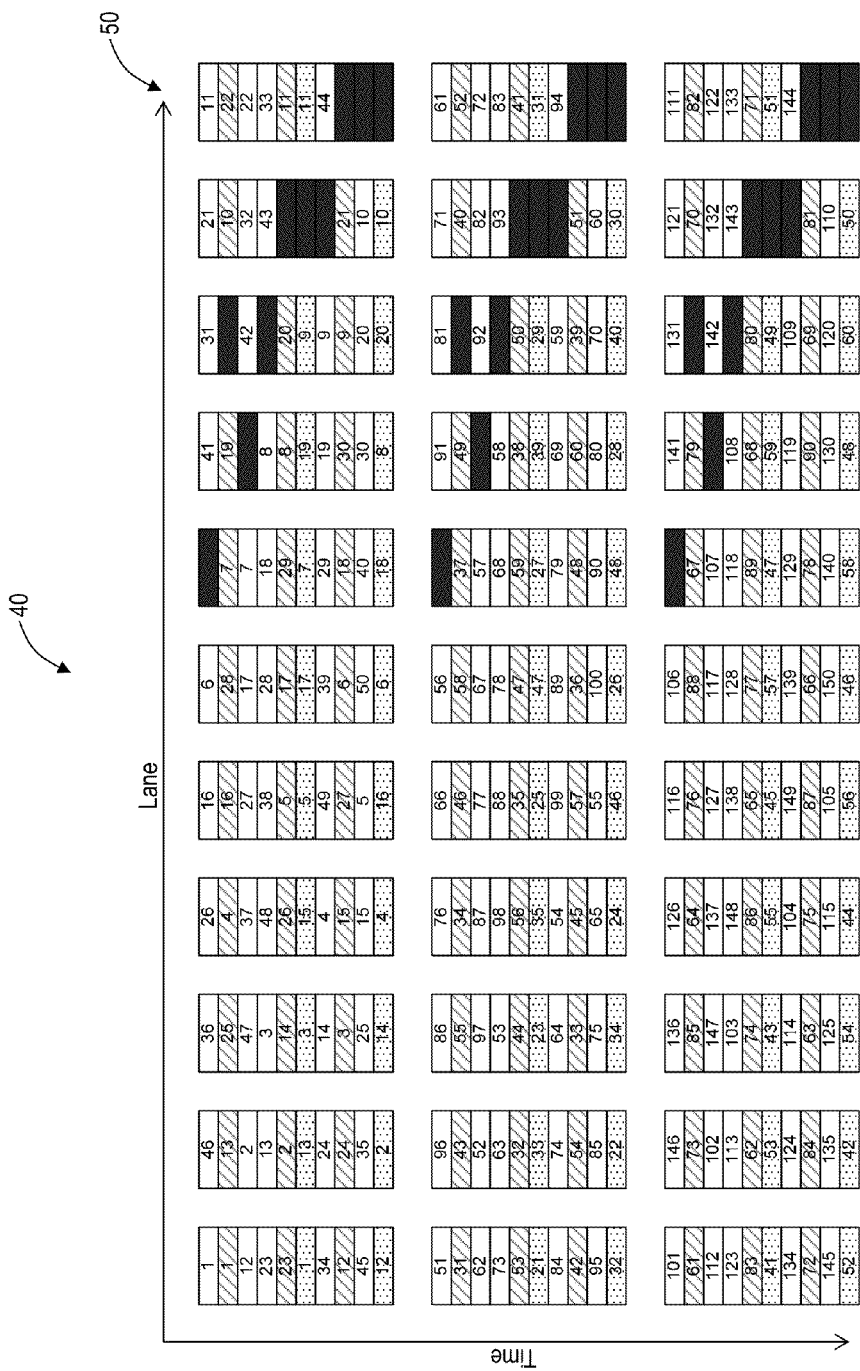

In FIG. 7, from the configuration in FIG. 6, each row of a client is barrel-shifted by a factor based upon its position within the frame. The factor includes the first row of a client not being shifted, the second row being shifted by one, the third row being shifted by two, i.e. each subsequent row is shifted by +1 from the previous. As can be seen in FIG. 7 relative to FIG. 6, all bytes for each client are in the correct lane, but not in the correct order. For example, for the client A, the byte #1 is in the first byte lane, byte #2 is in the second byte lane, but in a third position, byte #3 is in the third byte lane, but in a fourth position, etc. At this point, the clients can be read out as time slices with appropriate addressing mechanisms.

Figure 8:
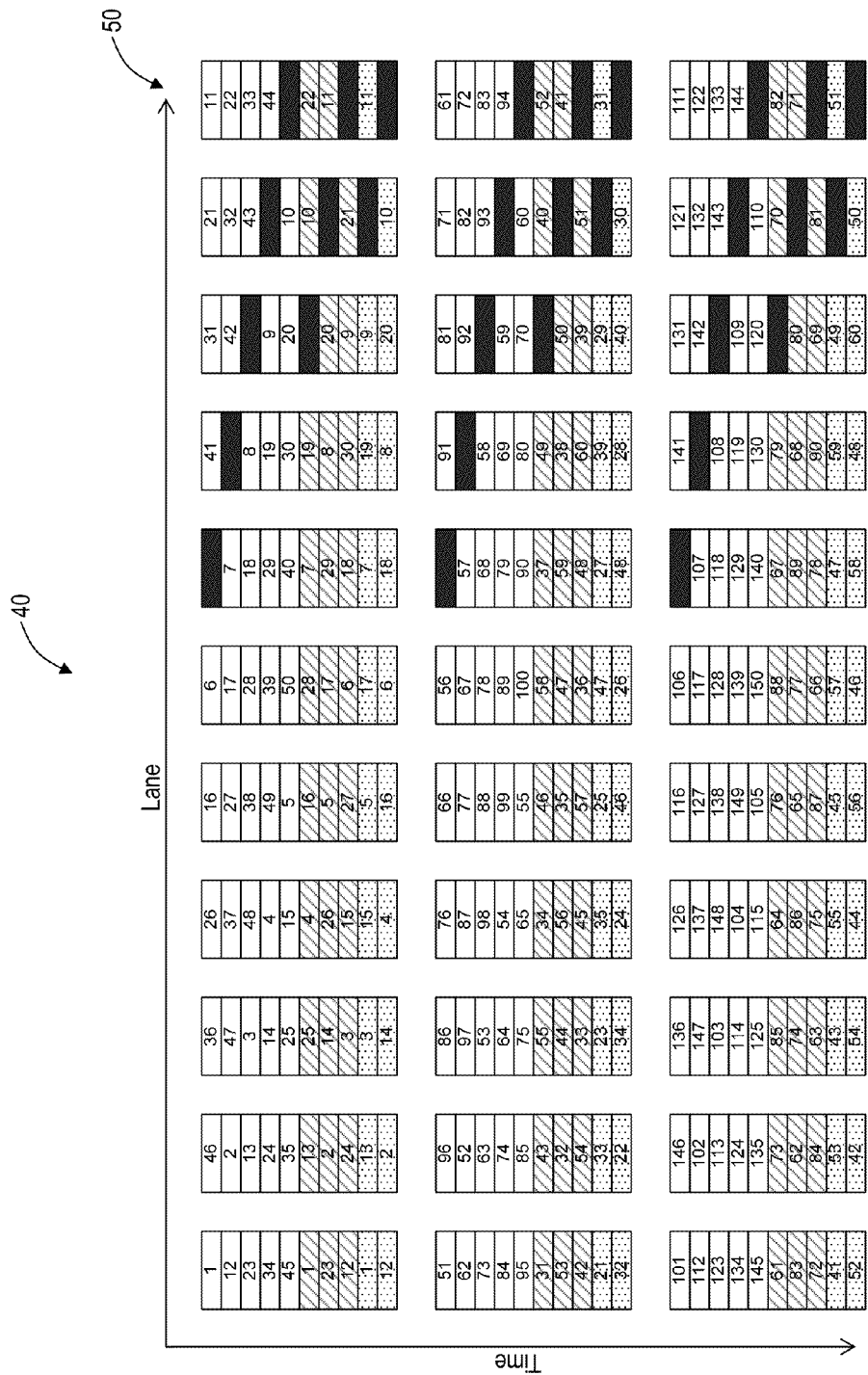
Figure 9:
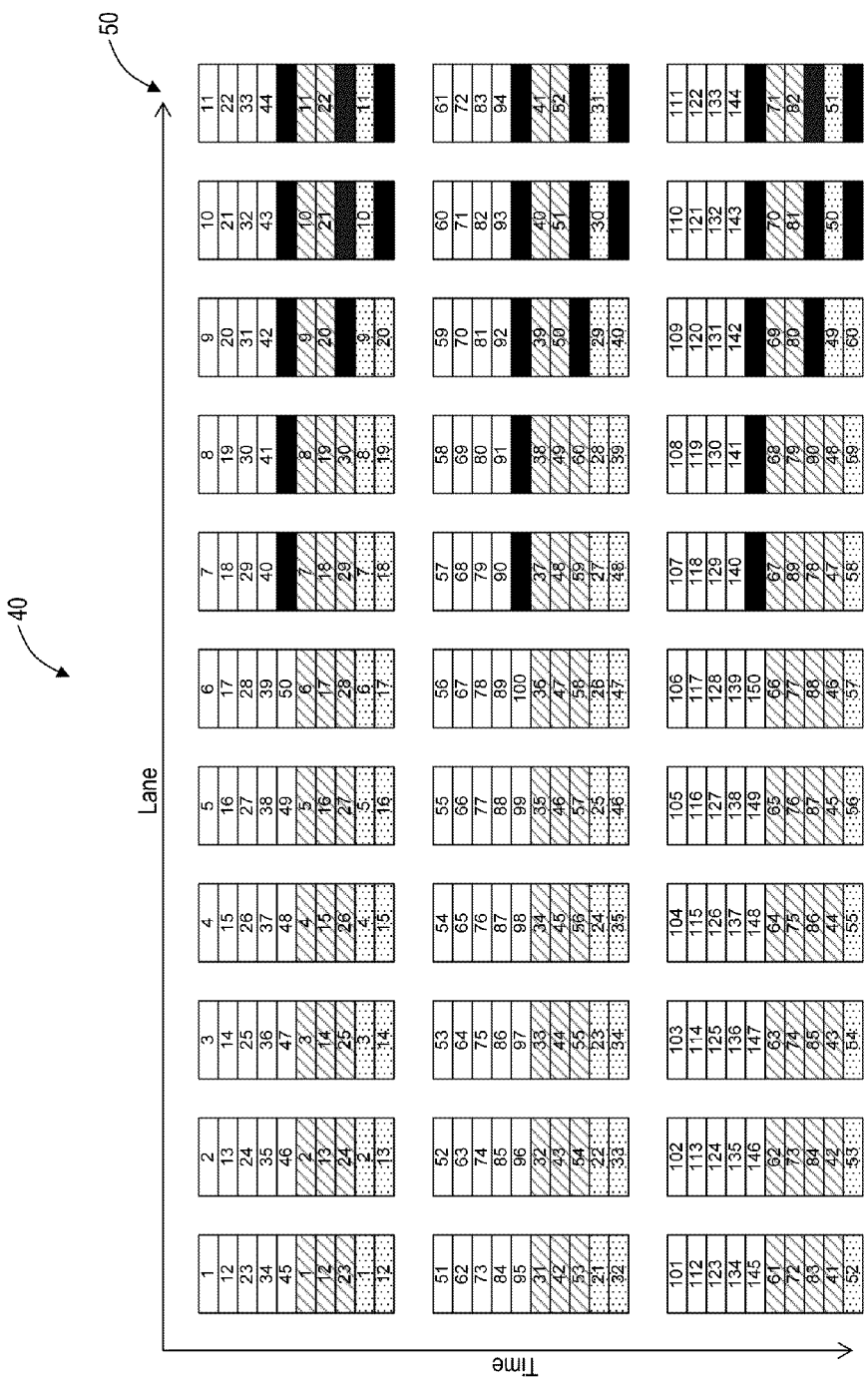

In FIG. 8, from the configuration in FIG. 7, each client is repositioned into a sequential set of memory locations in FIG. 8. For example, the client A uses address 0 through 4, the client B uses addresses 5 through 7, and the client C uses address 8 and 9. As seen by comparing FIG. 8 to FIG. 7, the relative positions are the same in the byte lanes, but the rows are rearranged by client. In FIG. 9, from the configuration in FIG. 8, each lane is read in the proper order so that each row contains P sequential bytes of the client. The following pseudo code computes the address for each lane for each client a=start;

```
for (i=0;i<M; i=i+1) begin
    for (j=0;j<P; j=i+1) begin
        addr[i][j]=a;
        a=(a+1)% M;
    end
end
```

Note, this does not require physically moving each byte, but setting up an addressing scheme that logically positions each byte as shown in FIG. 9.

Figure 10:
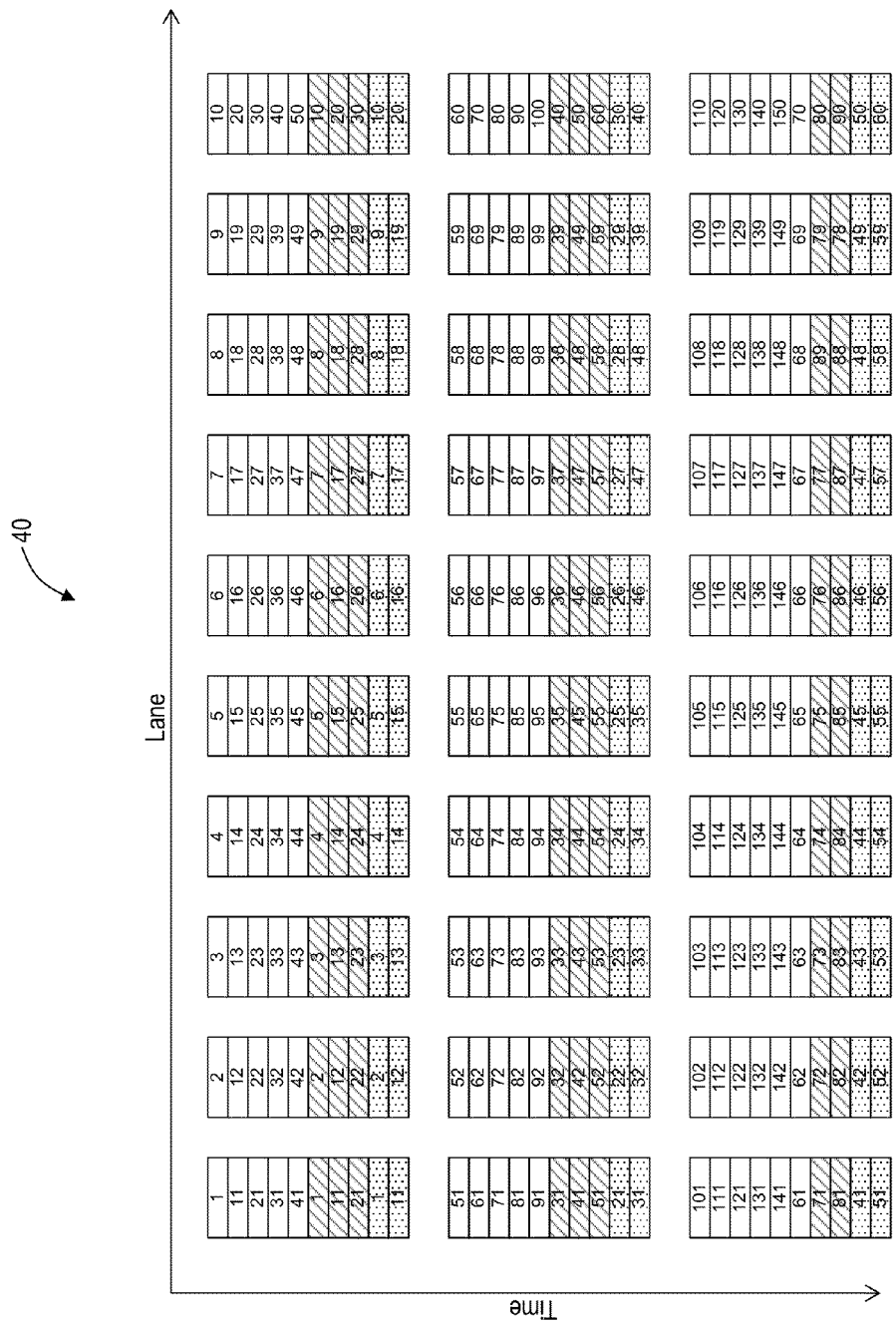

In FIG. 10, a P-to-N gearbox is used to get the clients to the proper byte lane width of N from P. Specifically, the P-to-N gearbox converts the P byte lanes back to N byte lanes removing the black (empty) bytes and the phantom lane 50. In the example here, the gearbox is an 11-to-10 gearbox. As can be seen in FIG. 10, the byte lanes now contain time slices of each of the clients A, B, C.

In the foregoing examples of FIGS. 3-10, client A occupied byte lanes 1, 3, 4, 7, and 9, client B occupied byte lanes 2, 5, and 8, and client C occupied byte lanes 6 and 10. The conversion method 20 contemplates reconfigurability with respect to the client assignments in the byte lanes. That is, while the number of byte lanes is fixed at N, the client assignments in the N byte lanes can change over time, and the conversion method 20 supports such reconfigurability while in operation. Specifically, the conversion method 20 can be reconfigured "hitlessly" during operation such that individual clients do not experience any data discontinuity upon reconfiguration of other lanes and slices. This is accomplished via proper pipelining of the byte lanes and time slices upon client reconfigurations. For example, the conversion method 20 can simply reassign which byte lanes go with which clients upon reconfiguration. An example of client reconfiguration can include clients A and C being deleted, and new client D occupying byte lanes 1, 3, 4, 6, and 7 and new client E occupying byte lanes 9 and 10.

Figure 11:
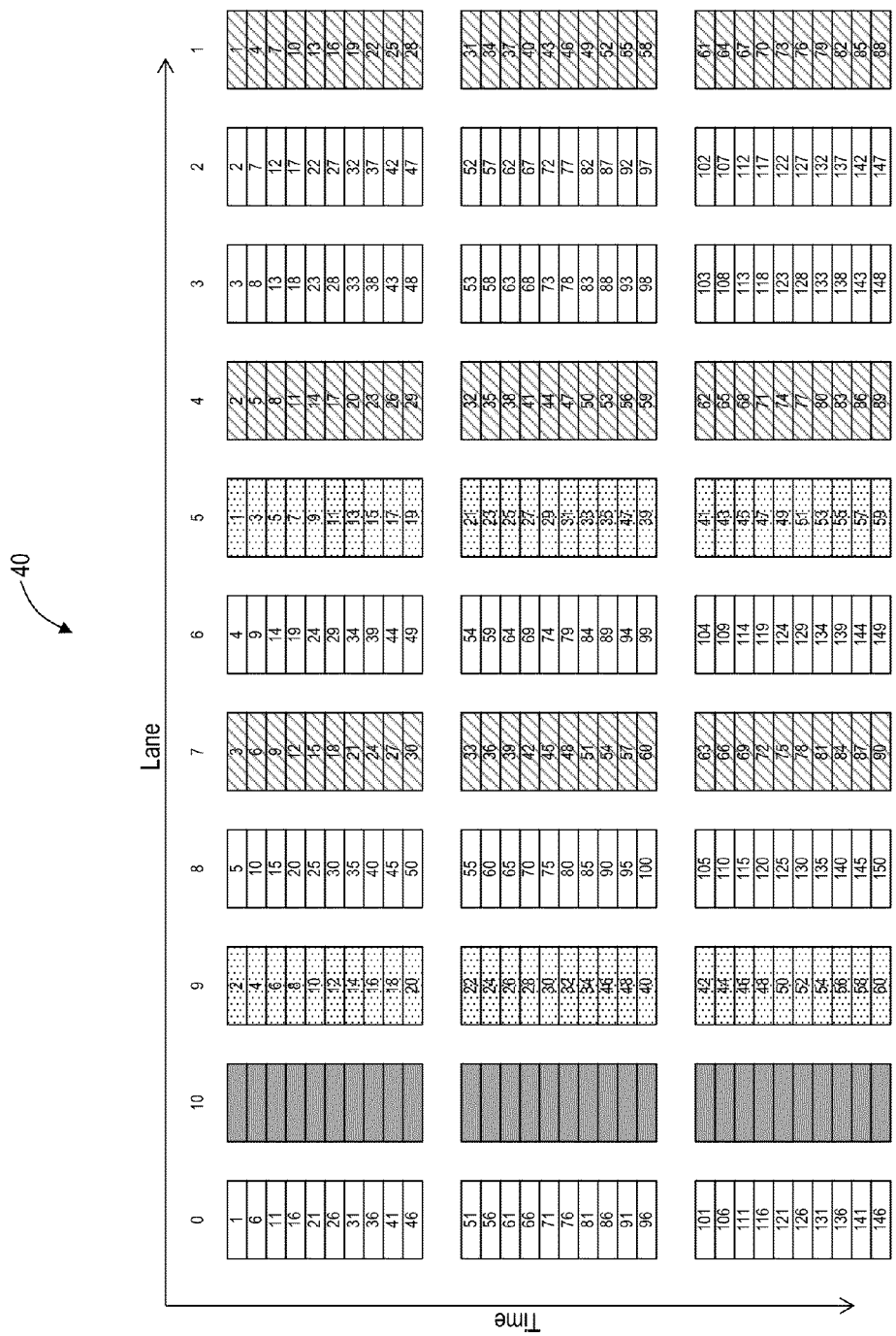
FIGS. 11-13 are block diagrams of a barrel shifter operation and delay on the signal of FIGS. 3 and 4.
Figure 12:
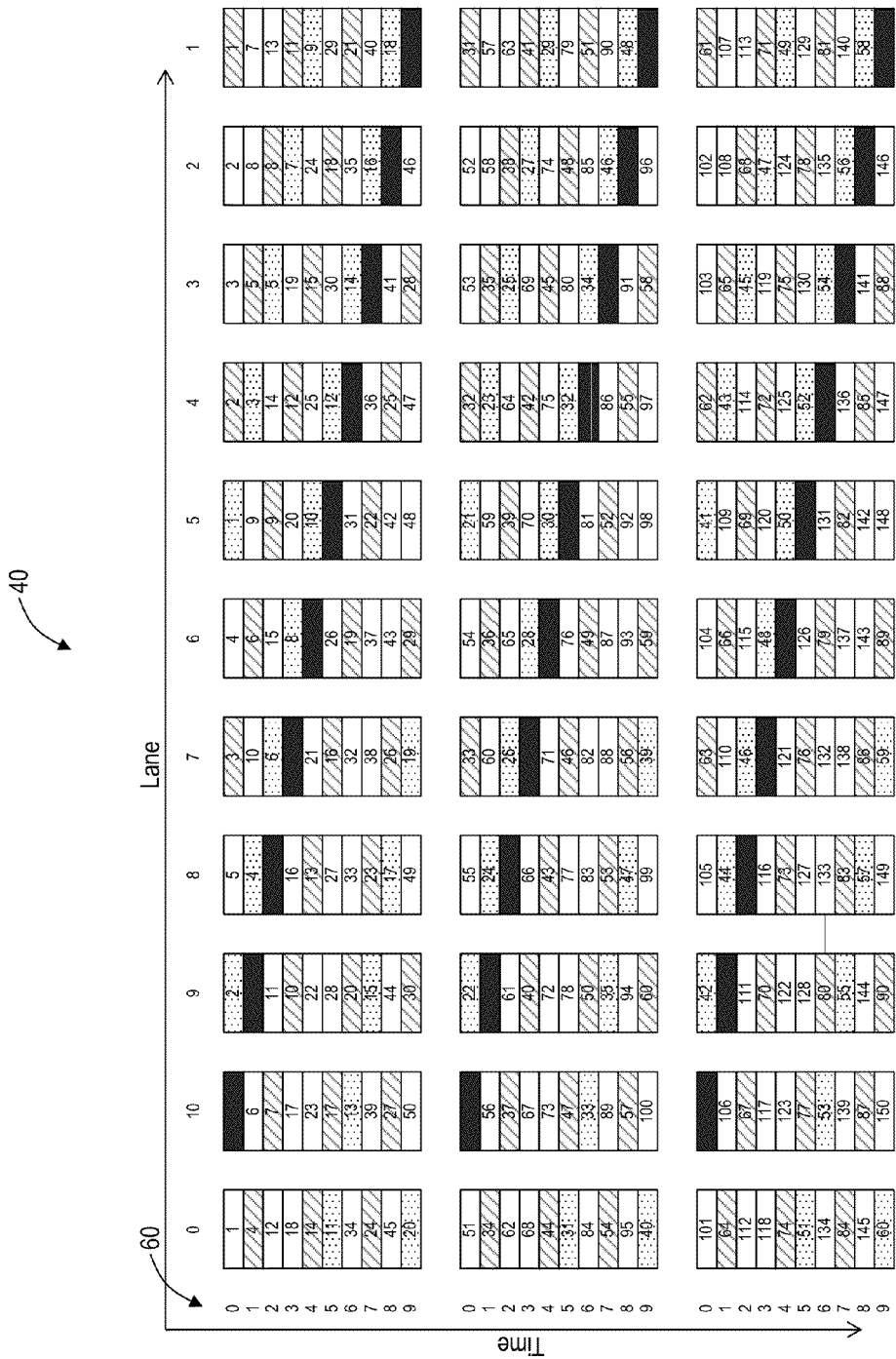
Figure 13:
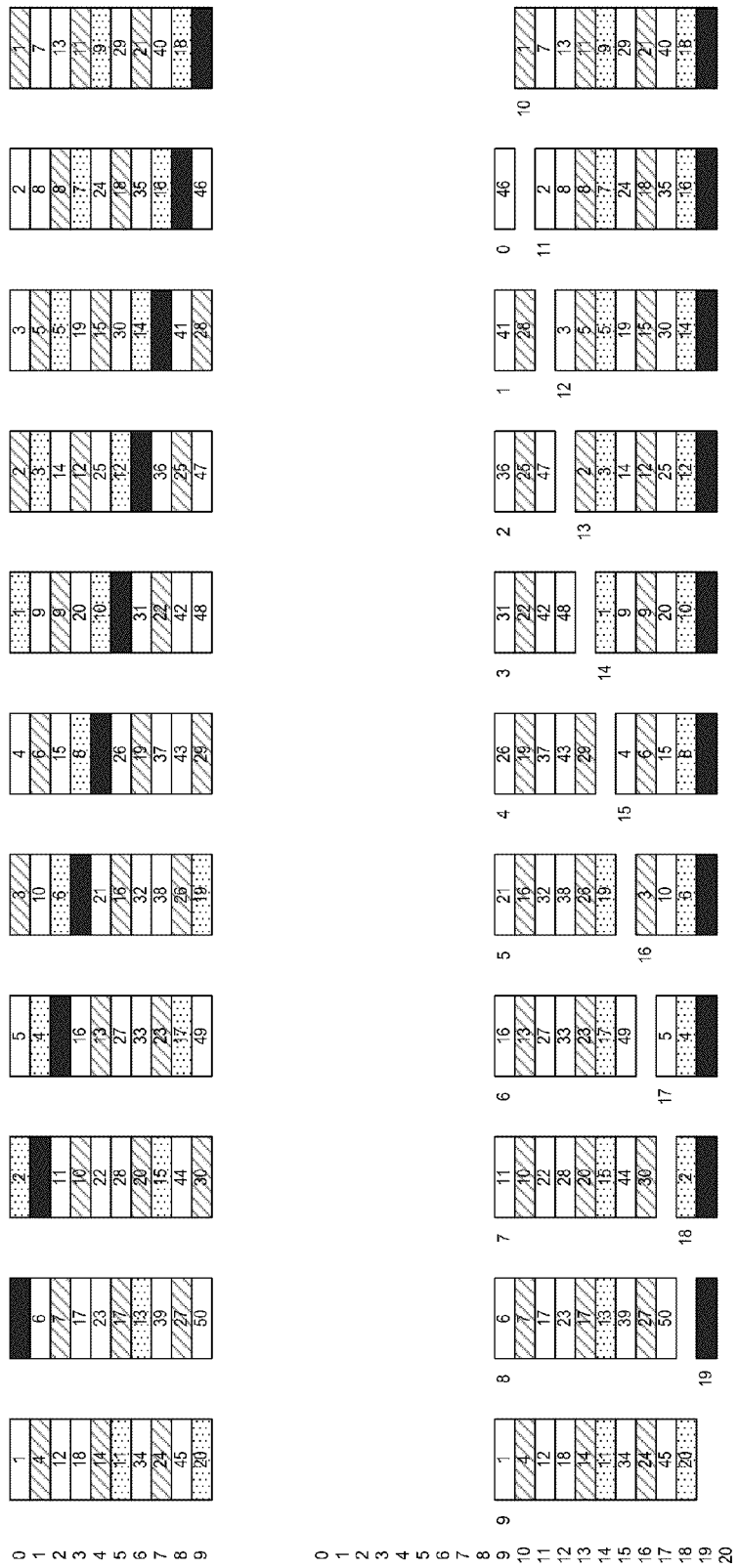

Referring to FIGS. 11-13, in an exemplary embodiment, a barrel shifter operation and delay is illustrated on the signal 40. FIG. 11 starts from the signal 40 in FIG. 4 where the phantom lane 50 is added. The first step in the barrel shifter operation and delay is to reorganize the byte lanes. Assuming the byte lanes are numbered 0 to P-1, i.e. 0 to 10, in FIG. 4, the byte lanes are reorganized as shown in FIG. 11. In FIG. 12, the byte lanes are shifted by a lane position 60 amount. Specifically, the first row is not shifted, i.e. lane position 60 of 0, the second row is shifted by one position, i.e. lane position 60 of 1, etc. In FIG. 13, each byte lane is delayed to align client tributary slots across each row.

In the foregoing descriptions, the conversion method 20 is described within the context of converting byte lanes to time slices. Those of ordinary skill in the art will recognize the conversion method 20 can be reversed to convert time slices to byte lanes. That is, the entire operation of the conversion method 20 is reversible by changing the order of operations, e.g. changing reads to writes, etc.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. In an exemplary embodiment, the circuit system and methods can be realized in an FPGA as a combination of look up tables (LUTs) and RAM. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A circuit, comprising:
   N byte lanes, wherein N comprises an integer; and
   a plurality of buffers forming P byte lanes, wherein P comprises a smallest prime number such that P≥N with P minus N of the P byte lanes comprising phantom lanes;
   wherein data from the N byte lanes is circularly interleaved into the plurality of buffers such that data for time slices needed at a same time is located in different buffers; and
   wherein the data is read out of the plurality of buffers with appropriate addressing to convert to time slices.

2. The circuit of claim 1, further comprising:
   an incoming set of buffers for at least a number of samples equal to N;
   wherein the data from the N byte lanes is first stored in the incoming set of buffers and transferred into the plurality of buffers thereafter.

3. The circuit of claim 2, wherein bytes are collected in groups of N in the incoming set of buffers.

4. The circuit of claim 1, wherein the N byte lanes comprise at least one client and each of the at least one client occupying any number M of tributary slots, M≤N.

5. The circuit of claim 4, wherein each of the at least one client is circularly interleaved by its M number of tributary slots such that each of the N byte lanes moves to a position (l*M) modulo P, where l is a number of each of the N byte lanes.

6. The circuit of claim 5, wherein each row of the at least one client is barrel shifted by a factor based upon its row position, the factor comprising a first row not being shifted and each subsequent row being shifted +1 from a previous row.

7. The circuit of claim 6, wherein each of the at least one client is positioned into a sequential set of memory locations.

8. The circuit of claim 7, wherein each byte lane is read in a proper order such that each row contains P sequential bytes of the at least one client.

9. The circuit of claim 8, further comprising a P-to-N gearbox to remove the phantom lanes.

10. The circuit of claim 1, wherein P is selected to utilize finite field arithmetic in GF(P) guaranteeing different fields of the N byte lanes are slotted in correct lanes when converting to the time slices.

11. The circuit of claim 1, wherein each of the N byte lanes correspond to an Optical channel Data Unit flex (ODUflex).

12. A system, comprising:
    an input circuit;
    a byte lane to time slice conversion circuit; and
    a processing circuit;
    wherein the input circuit provides an aggregated signal of N byte lanes to the byte lane to time slice conversion circuit, and the byte lane to time slice conversion circuit converts the N byte lanes into time slices for the processing circuit utilizing a plurality of buffers, phantom lanes configured to ensure data need for the time slices from different byte lanes are in different buffers, and an addressing scheme to read out the data in the plurality of buffers to form the time slices.

13. The system of claim 12, wherein the input circuit and the byte lane to time slice conversion circuit comprises:
    N byte lanes, wherein N comprises an integer; and
    a plurality of buffers forming P byte lanes, wherein P comprises a smallest prime number such that P≥N with P minus N of the P byte lanes comprising phantom lanes;
    wherein data from the N byte lanes is circularly interleaved into the plurality of buffers such that data for time slices needed at a same time is located in different buffers; and
    wherein the data is read out of the plurality of buffers with appropriate addressing to convert to time slices.

14. A method, comprising:
    receiving an incoming aggregated signal;
    buffering the data from the incoming aggregated signal in a first set of buffers comprising N lanes;
    circularly interleaving the data into a second set of buffers comprising P lanes, wherein P comprises a smallest prime number such that P≥N; and
    reading the data out of the second set of buffers with an appropriate addressing scheme.

15. The method of claim 14, wherein the N lanes comprise at least one client and each of the at least one client occupying any number M of tributary slots, M≤N.

16. The method of claim 15, further comprising:
    circularly interleaving each of the at least one client by its M number of tributary slots such that each of the N lanes moves to a position (l*M) modulo P, where l is a number of each of the N lanes.

17. The method of claim 16, further comprising:
    barrel shifting each row of the at least one client by a factor based upon its row position, the factor comprising a first row not being shifted and each subsequent row being shifted +1 from a previous row.

18. The method of claim 17, further comprising:
    positioning each of the at least one client into a sequential set of memory locations.

19. The method of claim 18, further comprising:
    reading each byte lane in a proper order such that each row contains P sequential bytes of the at least one client; and
    performing a P-to-N gearbox to remove the phantom lanes.

20. The method of claim 15, wherein the method converts the incoming aggregated signal from a byte lane configuration to a time slice configuration relative to at least one client signals in the incoming aggregated signal, and wherein the method is reversible to convert a signal in the time slice configuration to the byte lane configuration.

* * * * *